Jan. 26, 1943.　　　B. P. BAGBY ET AL　　　2,309,616
OZONE GENERATOR
Filed Nov. 2, 1937　　　5 Sheets-Sheet 1
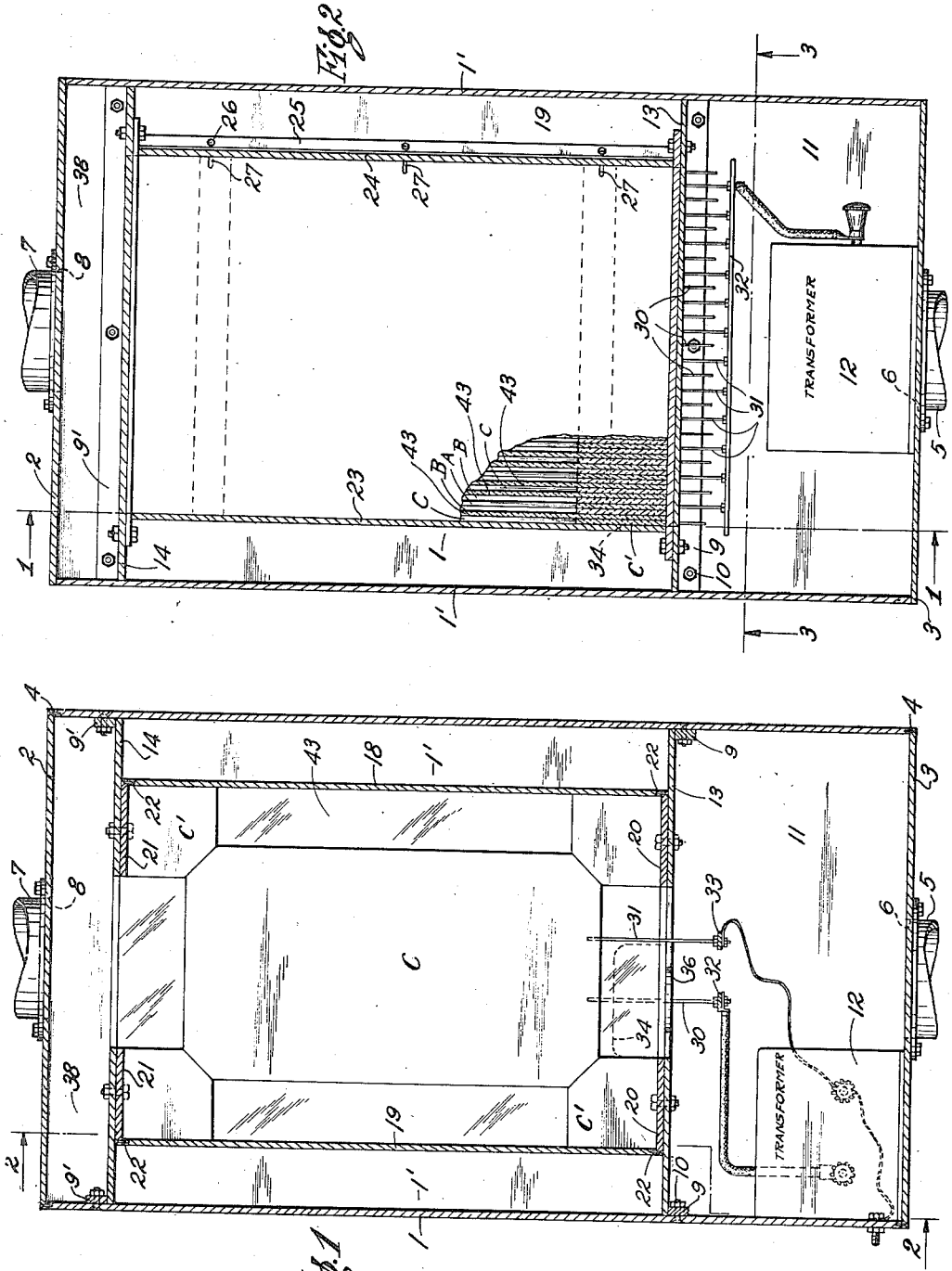
INVENTORS
BEN P. BAGBY
& CHARLES B. DE LANO
BY
ATTORNEYS

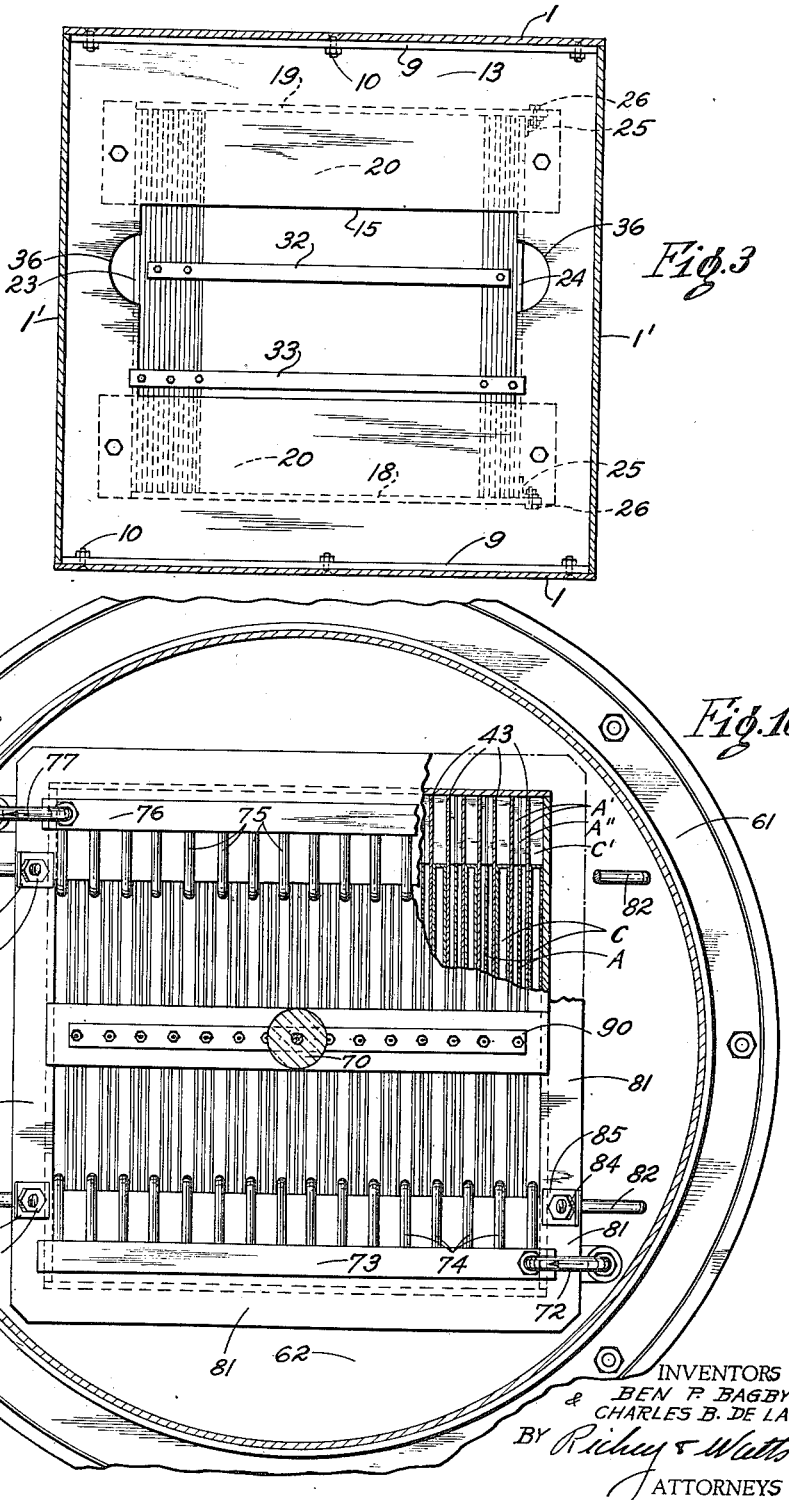

Jan. 26, 1943. B. P. BAGBY ET AL 2,309,616
OZONE GENERATOR
Filed Nov. 2, 1937 5 Sheets-Sheet 3
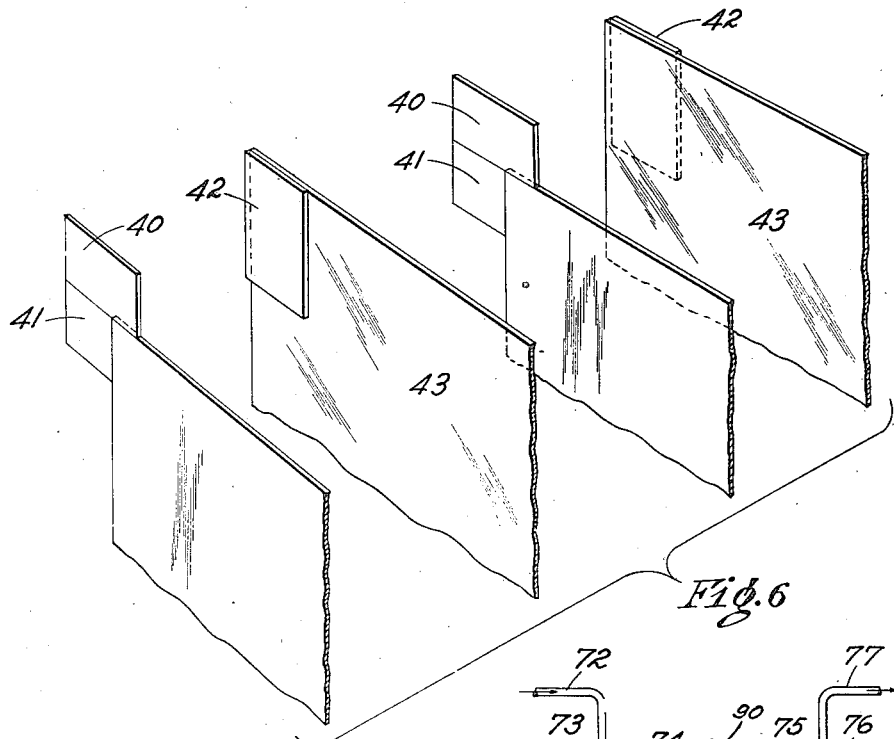
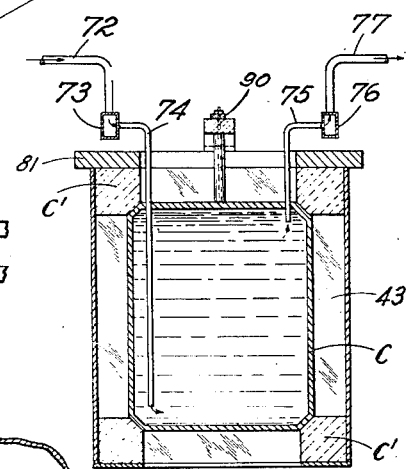
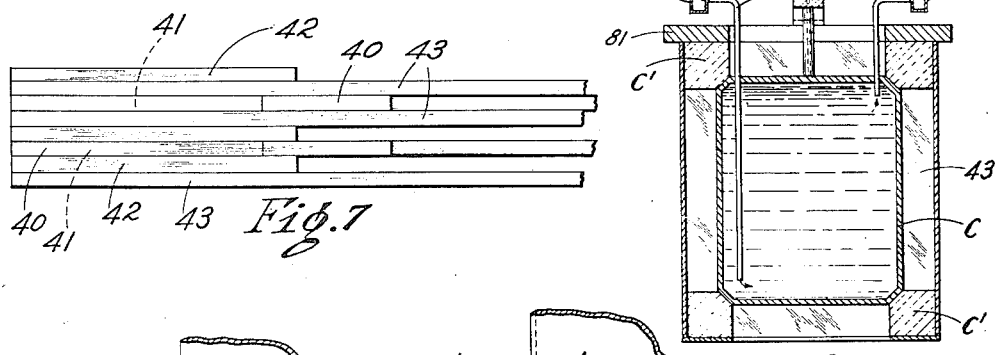
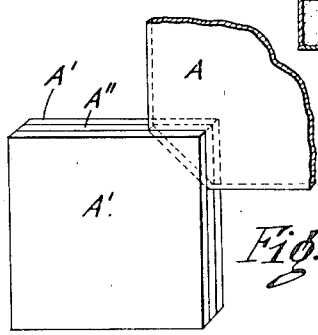
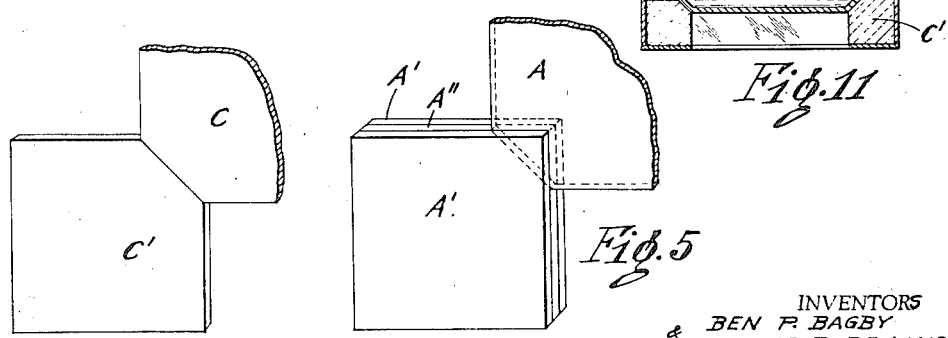
INVENTORS
BEN P. BAGBY
CHARLES B. DE LANO
BY Richey & Watts
ATTORNEYS

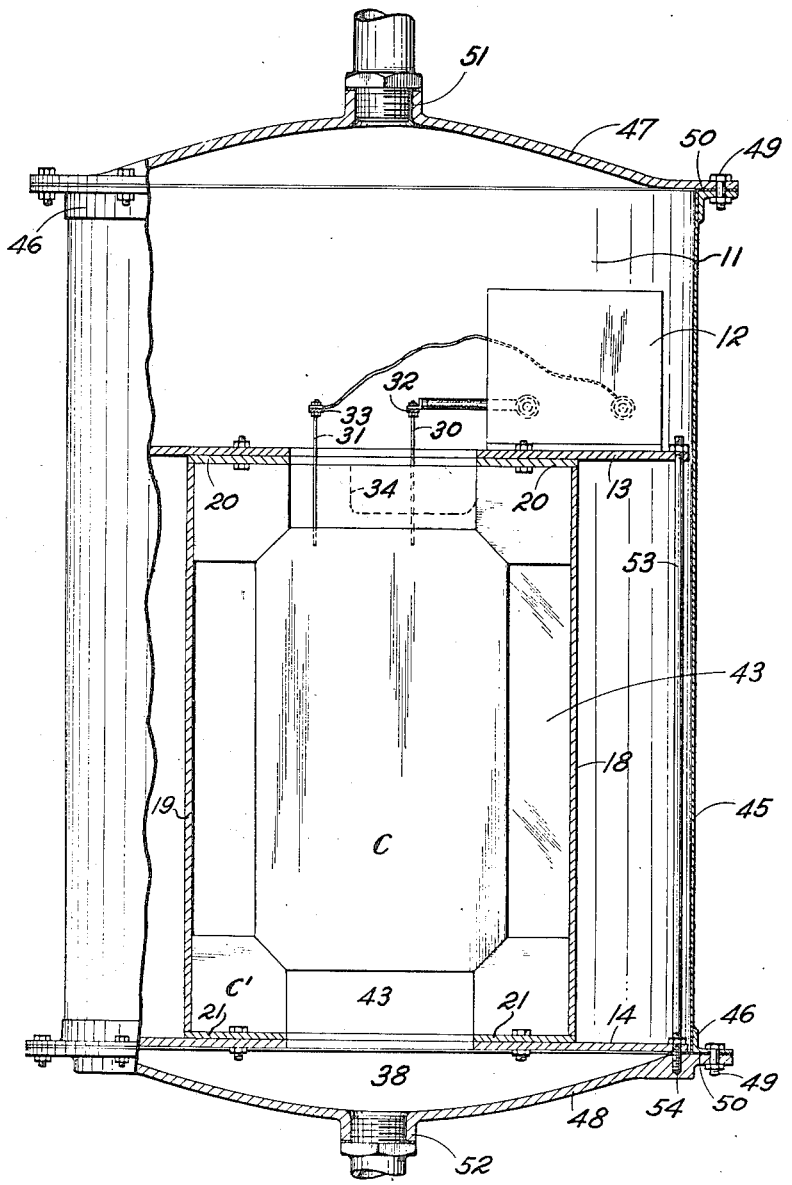

Jan. 26, 1943.   B. P. BAGBY ET AL   2,309,616
OZONE GENERATOR
Filed Nov. 2, 1937   5 Sheets-Sheet 5
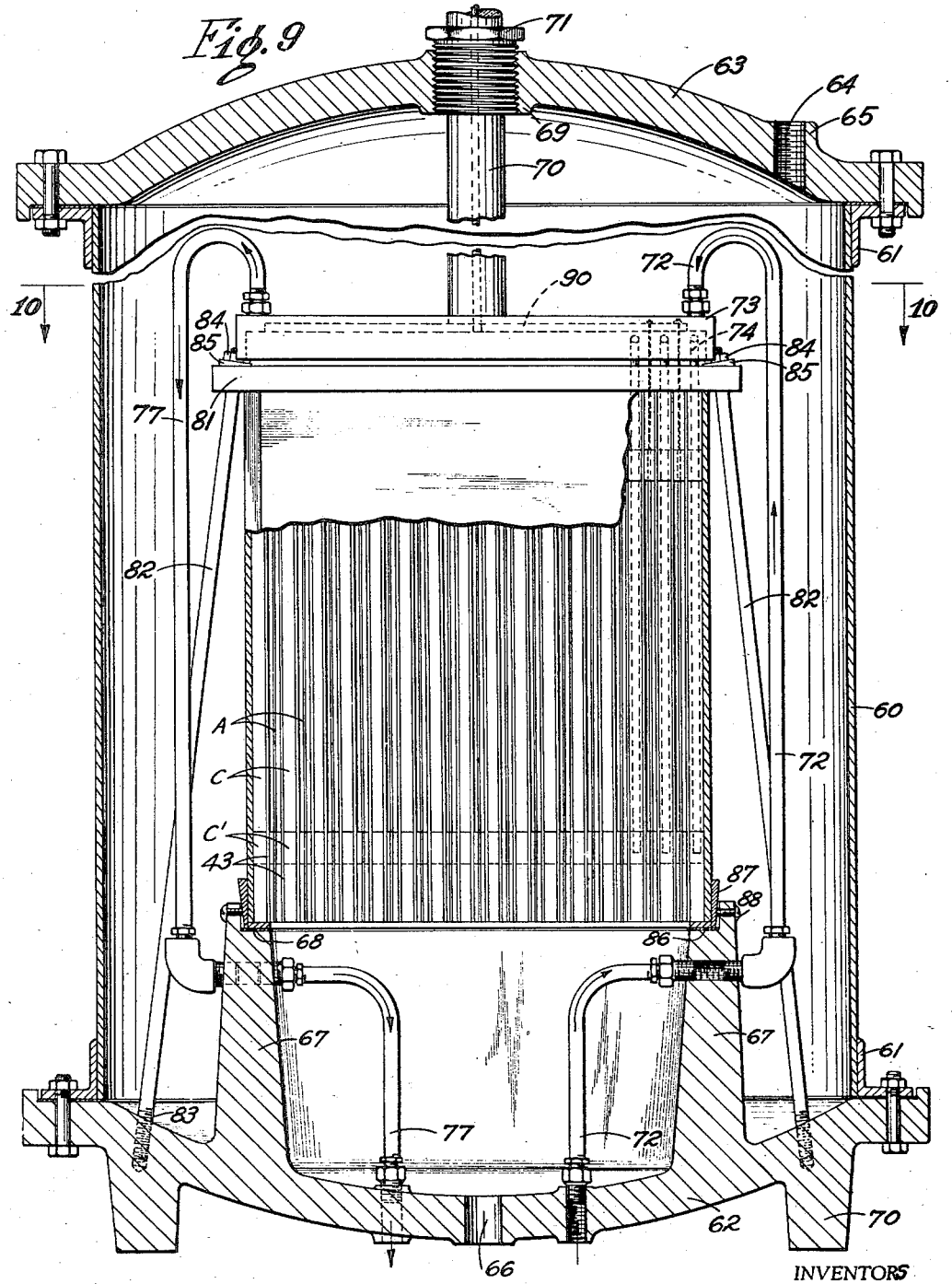
INVENTORS
BEN P. BAGBY
& CHARLES B. DE LANO
BY
ATTORNEYS Patented Jan. 26, 1943

2,309,616

UNITED STATES PATENT OFFICE 2,309,616

OZONE GENERATOR

Ben P. Bagby, Louisville, Ky., and Charles B. De Lano, Cleveland, Ohio, assignors to Ozone Development Corporation, a corporation of Ohio Application November 2, 1937, Serial No. 172,401

2 Claims. (Cl. 204—317)

This invention relates to the production of ozonized air, and more particularly to an apparatus of the electrical discharge type for ozonizing air.

Although ozonizers have been commonly known and have included groups of alternately disposed anode and cathode plates with a dielectric therebetween, all of the previous ozonizers have been such that the capacity or ozone output has been substantially limited. The previous devices were not only impractical for production of ozone on a large scale, but could not be enlarged so as to produce ozone on a large scale without meeting certain structural difficulties which would make the production of such devices impossible or impractical.

By the present invention it is possible to make ozonizers which are of large capacity and which are particularly adapted for the production of ozone in large quantities for use in various commercial operations. For instance, one particular place where such an ozonizer is used, is in the production and treating of spirituous liquors such as described in the co-pending application of Ben P. Bagby, Serial No. 172,400, filed November 2, 1937, Patent No. 2,145,243. Although these ozonizers of our invention are particularly adapted for the purposes described in said application, it is obvious that the same may be also used for production of ozone for numerous other purposes and that, although the device described is as previously stated peculiarly adapted for commercial usages, smaller units may be manufactured embodying the principles of construction hereinafter disclosed.

By the present invention it is possible to standardize the manufacture of the elements of the devices which go to make the units so that finished units may be produced having any desired range of capacities. Still other advantages of the invention reside in so constructing an ozonizer that air may be circulated through the same under relatively high pressure and further by so positioning and arranging the parts that a relatively large electrode surface is exposed to the air for ozonizing the same.

Still other advantages of the invention and the invention itself will become more apparent from reference to the following description of some embodiments thereof, which description is illustrated by the accompanying drawings.

In the drawings:

Fig. 1 is a vertical sectional view of a device constructed according to the invention taken on the line 1—1 of Fig. 2;

Fig. 2 is a similar view taken on the line 2—2 of Fig. 1;

Fig. 3 is a view taken on the line 3—3 of Fig. 2 looking in the direction of the arrows;

Fig. 4 is an isometric view showing a cathode-electrode support with a fragment of the electrode in position;

Fig. 5 is a similar view to Fig. 4 of an anode support;

Fig. 6 is an exploded isometric view of a modified form of cathode and anode support;

Fig. 7 is a plan view of the cathode and anode support of Fig. 6 in assembled position;

Fig. 8 is a view partially in elevation and partially in section of a modified form of unit adapted for low pressure operation;

Fig. 9 is a vertical sectional view of a large capacity high pressure device embodying our invention with certain parts broken away and shown in section;

Fig. 10 is a sectional view taken on the line 10—10 of Fig. 9, with certain parts broken away;

Fig. 11 is a diagrammatic view of a cathode showing the manner of introduction and discharge of cooling fluid therethrough.

Referring now to the drawings throughout which like parts have been designated by like reference characters, the device generally comprises a housing or casing having inlet and outlet ducts, an ozonizer therein, and means supporting the ozonizer and defining distribution chambers communicating with the ends of the passages through the ozonizer.

More specifically, the device as viewed in Figs. 1 to 3, inclusive, is provided with an outer housing which may comprise four vertically and oppositely disposed side walls 1 and 1' secured at the corners to each other by screws 4 and having their ends closed by square top and bottom plates 2 and 3, respectively.

In the type shown, the inlet comprises a tube 5 which communicates by an aperture 6 in the bottom plate 3 with the interior of the housing, and the outlet comprises a similar tube 7 communicating by the aperture 8 in the plate 2 with the top of the housing. Although the air flow through the housing is described as being from the lower end upward, it will also be obvious that the device may be operated in the reverse position with the transformer and inlet at the top of the housing if desired, it being preferred, however, to have the transformer at the inlet end of the housing so that the components and wiring will not be subjected to any action which the ozonized air might have thereon.

A pair of horizontally disposed rails 9 are secured to opposite walls 1 by bolts or studs 10 adapted to support a plate 13 which may be secured to and in turn support the ozonizing element. The plate 13 being spaced from the bottom 3, provides a chamber 11 in which is housed a high voltage transformer 12 and the connections to the ozonizer elements, later to be described.

The ozonizer element per se comprises an inner housing in the form of a rectangular parallelopiped having its upper and lower ends securely bolted to the supporting plates 13 and 14 and positioned spaced from the inlet and outlet by the rails 9 and 9'.

The supporting plates are provided with centrally disposed rectangular apertures 15 (Fig. 3) in alignment with the inlet and outlet to the ozonizer unit. The ozonizer unit housing comprises vertically disposed side walls 18 and 19 secured to end plates 20 and 21 by screws 22 and plates 23 and 24 for closing the remaining sides. The plates 23 and 24 may be shifted sidewise between plates 18 and 19 to accommodate more or less of the electrodes depending upon the capacity for which the device is designed. That is, the electrodes which are in the form of substantially flat rectangular plates may be of uniform size, and the capacity of the particular ozonizer is determined by the number of plates. The plates are held in position by the clamping action of the walls 23 and 24 upon the supporting elements for the plates. The wall 23 is secured in place by screws 22 in a like manner to plates 18 and 19, the position of this particular wall having been previously determined by the number of elements which are to be enclosed. The wall 24, however, has secured thereto vertically extending angle strips 25 which are in turn bolted to the wall 19 by bolts 26 extending through the angle strips and through slots 27 in the walls 18 and 19. Having this one wall adjustable permits the elements to be securely or snugly clamped in spite of the fact that they may have some variation in thickness, it having been found that the dielectric used is not always of uniform thickness.

As best shown in Fig. 3, the upper and lower plates 20 and 21 comprise pairs of plates which are spaced from each other and which allow a rectangular opening intermediate the same in alignment with the electrodes.

The electrodes, as previously stated, may comprise substantially rectangular plates of aluminum or other suitable metal, held in position and spaced from each other by corner supports.

The electrode plates are preferably disposed in the container with the cathodes and anodes alternating. Sheets of dielectric such as glass are disposed adjacent to the cathodes and the glass sheets are in turn spaced from the anodes to provide channels through which the air may be circulated. For instance, in Fig. 2 we find, starting at the left of the figure, a cathode C adjacent the wall 23 and contiguous to it, a dielectric 43 spaced from the anode A by an air space B. Next comes another air space B on the other side of the anode, followed by a dielectric 43 and the cathode C between said dielectric and another sheet of dielectric 43. In this manner the elements are assembled to provide the desired area through which air is to be circulated.

The electrodes in addition to being spaced from each other, are also spaced from the enclosing walls of the container. One manner of supporting the electrodes is illustrated in Figs. 1 to 5, inclusive, and comprises a built-up support of laminated construction for engaging the four corners of the electrodes. The support is formed of a plurality of rectangular dielectric sheets of substantially the same thickness as the electrode and upon the edges of which the electrodes rest. For instance, the cathode is provided with oblique corners (Figs. 1 and 4) and is adapted to engage the oblique corner surface of the dielectric support C'. Next to the dielectric C' the insulating dielectric 43 fills the entire chamber longitudinally and transversely from top to bottom requiring no support other than the plates 20 and 21. The support for the anode which spaces the same from the dielectric to provide air passages, comprises two rectangular sheets A' separated from each other by a dielectric block A" similar to that shown at C'. These three sheets may be built up as integral elements, being cemented to each other but providing the oblique channel through the corner in which the anode A rests. Next to the anode support is another sheet of dielectric which is exactly the same as 43 and fills the chamber from top to bottom, these sheets of dielectric extending well beyond the extremities of the cathode and anode plates and abutting the walls 18 and 19 and the top and bottom plates 20 and 21. The supports for all four corners of the electrodes are built up similarly.

Obviously in assembling the device it will be preferable to place the supports at the bottom of the unit first, and the supports at the top of the unit last, the supports having been placed in position and the desired number of plates arranged therein. After all the plates of the unit and supports are in position, the wall 24 is moved against the same to compress the supports at the four corners; the bolts 26 are then tightened, and the whole assembly is thus held securely in position. The top plates 21 will then be secured in position. Obviously the assembly proceeding is one of convenience and can be varied so long as the elements ultimately attain the arrangement described.

As best shown in Fig. 1, the electrode plates are provided with connectors 30 for the anodes and 31 for the cathodes, which extend downward and are bolted to bus bars 32 and 33, respectively. The connectors extend well below the supporting plate 13 which is cut away at 36 (Fig. 3) to provide ample clearance for said connectors 30. The walls 23 and 24 are also cut out, as shown at 34, to provide sufficient electrical clearance for the connector 30 preventing discharges from said connector to the housing. The cathode plates may be at ground potential and hence no such provision for the connectors 31 need be made. The connectors 30 and 31 with their bus bars are also spaced sufficiently far apart that there will be no possibility of a discharge occurring therebetween.

The transformer 12 is supported at the lower end of the casing, being connected to a source of current by suitable conduits leading from the outside of the casing and not shown. The positive secondary terminal is connected to the anode bus bar 32 and the negative or ground is connected to cathode bus bar 33 and also grounded to the outer housing.

The electrode assembly may be bolted to the support 13, and the assembly and support inserted into the housing through the top to rest on the rails 9, after which the upper support 14 may be secured thereto, or the support 14 may also be bolted to the assembly before the insertion. The electrode assembly and supports being in position, the upper rails 9' are bolted in place on the walls 1 and 2 to securely hold the electrode assembly in position. The upper plate 2 of the housing may then be bolted in place and the device is ready or operation.

In operation the transformer being energized and the inlet 5 being connected to a source of air or oxygen, the high tension electricity charges the anode plates which are supported spaced from the dielectric plates 43, and which anode, when charged, causes an aurora or brush discharge to substantially fill the spaces B around the anode plates. The air which is being forced upward to the outlet, is thus acted upon and caused to be ozonized and passes out through the supporting plate 14 into the chamber 38 at the upper end of the outer casing and thence through the outlet 7 to the point of storage or use.

It will be noted that the supports 13 and 14 divide the housing into separate chambers, those at ends of the housing 38 and 11 serving as distribution chambers with the ozonizer element therebetween. Both of the supports 13 and 14 are provided with large rectangular openings therethrough in alignment with the spaces between the electrodes. The chamber 11 in the bottom of the housing acts as an inlet distribution chamber permitting equalization of the air supply and even distribution thereof upward through the channels and the outflow of ozonized air into the chamber is unrestricted.

Although we have shown the electrodes with the anode having the air space thereabout, it is also within the purview of our invention to provide air spaces about the cathode, should we so desire.

In Figs. 6 and 7 we have shown an alternate or modified form of corner support for the electrodes, Fig. 6 being an exploded view, and Fig. 7 being a fragmentary plan view of the assembled plates. In this instance the large dielectric 43 which extends beyond the periphery of the electrodes has cemented thereto at each corner on the side opposite to the cathode a rectangular dielectric sheet 42 which acts as a spacing block. The cathode plate in this instance is rectangular, not having the corners removed as in the previously explained embodiment, and is adapted to be positioned adjacent the glass dielectric sheet 43. An inverted L-shaped support is provided for the cathode and may be formed by a rectangular block 40 overhanging the corner of the electrode and a square or rectangular block 41 abutting the side edge of the electrode as shown in Fig. 6. The next sheet of glass dielectric has a block 42 at its corner also on the opposite side from the cathode. This permits the glass dielectrics to lie adjacent the cathode when assembled. The anodes are provided with similar corner blocks 40 and 41 to that of the cathode, but since the spacing blocks 42 on the glass dielectrics are toward the anodes, when the elements are assembled, we have the anodes spaced from the dielectric sheets, which thus leaves channels adjacent the anodes. It will be noted that the blocks 42 are wider than 41 and that when the blocks 42 are disposed adjacent the blocks 40 and 41 a socket is made, defined by the overhanging parts of the block 42, at the sides, and the bottom of the socket is defined by the inner angle formed by the position of the blocks 40 with 41. The elements when assembled then take the positions shown in Fig. 7. In actual assembly of the foregoing, it may be desirable to cement all of the blocks in the relation shown to the glass or dielectric sheets. In this event the sheets will be alternate rights and lefts. For instance, blocks 40 and 41 would be cemented on the side corners of one of the dielectric sheets. The opposite side would have a block 42 cemented in the relative position shown and adjacent the block 42 would be blocks 40 and 41. The next dielectric would be built up in a similar manner with the order of assembly reversed.

Should it be desirable to have channels adjacent the cathodes also, the glass or dielectric would merely have additional blocks 42 on opposite sides. It will thus be seen that the sockets are provided by this built-up structure which not only holds the electrodes spaced from each other, but also spaced a predetermined distance from the housing walls.

The device so far described is adapted to operate without any substantial air pressure other than that sufficient to cause the air to flow therethrough. In Fig. 8 we have illustrated a device where a slightly greater pressure may be used, which is desirable in some instances where the output of the device encounters a certain head of pressure which must be overcome to permit discharge. This structure will permit heads as high as ten pounds per square inch to be overcome. In this embodiment the housing comprises a cylindrical body 45 having annular flanges 46 welded to its upper and lower extremities and adapted to be bolted to convex heads 47 and 48 by bolts 49 with suitable sealing gasket 50 interposed therebetween. The upper head is provided with a threaded inlet 51 adapted to be connected to a pipe, and the lower head with a threaded outlet 52 for a similar purpose. In this modification the electrode assembly is substantially the same as that described for Figs. 1 and 2, the only difference being that the supporting plates 14 and 13 are circular in form, and the electrode unit is supported on the plate 14. The plate 13 is secured in spaced relation from the plate 14 by tie-bolts 53 which extend through the plate 13 and downward through the plate 14 being screw threaded into bosses 54 on the base or head 48.

This type unit is particularly adapted for ozonizing air and discharging the same under a low pressure, which pressure is, however, sufficient to overcome any head that it might encounter and wherein the ozone output would, because of the increased volume, be substantially greater.

In Figs. 9 to 11 inclusive we have illustrated a high pressure ozonizer which is adapted to ozonize unusually large quantities of air at high pressures. These pressures may go as high as one hundred and fifty pounds to the square inch or higher if it should be found necessary. In this instance, the housing comprises a cylindrical body 60 having annular flanges 61 welded to its ends. The bottom end of the housing is adapted to be closed by the convex base 62, having supporting legs 70, and the upper end is closed by the head 63. The base and head are secured to the housing by bolts which extend through the flanges 61, which flanges are disposed in seats formed adjacent the periphery of the heads, a suitable sealing gasket being interposed therebetween. The head is provided with a threaded opening 64 through a boss 65 adapted to be coupled to a conduit, not shown, for the admission of air or oxygen under pressure. The base is provided with a centrally disposed ozone outlet 66 formed to be suitably coupled to a similar conduit, not shown.

The base is provided with an upwardly extending substantially rectangular support 67, the upper extremity of which is formed to provide a seat 68 upon which the lower portion of the electrode assembly is carried.

The electrode assembly may be constructed in a similar manner to that of the embodiment shown in Figs. 1 and 2. The drawings, however, illustrate a modified form of assembly wherein the cathode electrodes are provided with means for cooling the same. The device shown also contemplates mounting the high tension transformer exteriorly. In this instance the high tension or hot line is brought in through a boss 69 in the center of the head through an insulator 70. A high pressure packing including the nut 71 sealing the insulator at its point of passage through the head. Should the transformer be mounted interiorly of the casing, the hot line would merely have substituted therefor a low potential line to the primary of the transformer.

As previously stated, the embodiment shown is provided with means for cooling the cathodes. In order to accomplish this the cathodes are substantially thicker than the cathodes described in the earlier embodiment and have a hollow interior through which a cooling medium, such as water, may be circulated. Obviously any suitable cooling fluid may be utilized.

Water is admitted through the base by suitable connections into a tube 72 and thence conducted through the support 67 upwardly by the tube 72 to a manifold 73. The manifold 73 extends transversely across the electrode unit above the same and is provided with a plurality of feeders 74, Fig. 10, which extend through the tops of the cathodes adjacent one edge and into their hollow interiors, terminating spaced from the bottom, Fig. 11. The fluid is thus conducted from the source of supply and is discharged adjacent the bottom of the electrodes. Discharge tubes 75 are provided which extend into the cathodes at the opposite edge and terminate spaced at or from the top. The fluid thus flows through the cathode, and is discharged out of the upper end of the cathode through the discharge tubes 75 into a discharge manifold 76. The fluid is then conducted from the manifold 76 by the tube 77, downward through the supporting members 67 and the base 62. Obviously the conduits 72 could enter and depart from the housing at other points.

The supporting frame for the electrodes may be substantially the same and constructed in a similar manner as that of the device described in Figs. 1 and 2. The upper housing plates, however, may be heavier and provided with overhanging portions 81 which are adapted to receive the ends of tierods 82 which are threaded into the base at 83 and extend through the portion 81 which is thus held down by a nut 84 on a wedge shaped washer 85. The lower end of the housing rests on a gasket 86 in the seat 68 and is secured thereon by wedges or shims 87 and screws 88.

The corner supports for the electrodes are substantially the same as those described in Figs. 1 to 5 inclusive, except that, the cathode being substantially thicker, the blocks C' are made to a corresponding thickness. In event the supporting arrangement of Figs. 6 and 7 is used, obviously the blocks 40 and 41 supporting the cathode would be correspondingly thicker.

High tension current is supplied to the anodes through the hot line encased in the insulator 70 from the transformer, not shown, to the bus bar 90, the bus bar 90 being connected to the anodes in a similar manner to that previously described. In the embodiment shown, the cathodes are grounded by the fluid conducting tubes. Should the device be operated without a cooling fluid, obviously the conduits therefor would be omitted and it would be necessary to provide another type of ground for the same, similar to that shown in Figs. 1 and 2.

The operation of the device is similar to that previously described except that air or oxygen is introduced under relatively high pressure and cooling fluid is forced through the cathodes. Increasing the air pressure and cooling the cathodes materially increases the ozone output.

It is to be noted that the support 67 forms a chamber below the electrodes of substantially the same character as that described for the other embodiments.

Having thus described our invention, we are aware that numerous and extensive departures may be made therefrom, but without departing from the spirit of the invention or the scope of the appended claims.

We claim:

1. An ozonizer comprising an outer shell having end and side walls and interior partitions secured to, supported substantially entirely by, and extending at substantially right angles to, the said side walls and dividing the interior of the shell into end compartments and a middle compartment, an inner shell in the middle compartment having side walls spaced inwardly from the side walls of the outer compartment and end walls secured to said partitions, and a plurality of rectangular, flat, plate-like electrodes and dielectrics in the inner shell and disposed in planes parallel to the side walls of the inner shell, said inner shell, electrodes and dielectrics being supported substantially entirely by said partitions, the partitions and the end walls of both shells having aligned openings for substantially straight line flow of gas through the ozonizer from end to end.

2. An ozonizer comprising an outer shell having end and side walls and interior partitions secured to, supported substantially entirely by, and extending at substantially right angles to, the said side walls and dividing the interior of the shell into end compartments and a middle compartment, an inner shell in the middle compartment having side walls spaced inwardly from the side walls of the outer compartment and end walls secured to said partitions, and a plurality of rectangular, flat, plate-like electrodes and dielectrics in the inner shell and disposed in planes normal to the end walls of the inner shell, said inner shell, electrodes and dielectrics being supported substantially entirely by said partitions, one of the side walls of said inner shell being adjustable relative to the other side walls thereof to exert clamping force on said electrodes and dielectrics in said inner shell, the partitions and the end walls of both shell having aligned openings for substantially straight line flow of gas through the ozonizer from end to end.

BEN P. BAGBY.
CHARLES B. DE LANO.